(12) United States Patent
Dickens

(10) Patent No.: US 10,598,430 B2
(45) Date of Patent: Mar. 24, 2020

(54) BEVERAGE CHILLER

(71) Applicant: Tequila Cuervo, S.A. de C.V., Tlaquepaque (Jalisco) (MX)

(72) Inventor: Anthony Thomas Fitzpatrick Dickens, London (GB)

(73) Assignee: TEQUILA CUERVO, S.A. DE C.V., Santa Fe (MX)

( * ) Notice: Subject to any disclaimer, the term of this patent is extended or adjusted under 35 U.S.C. 154(b) by 324 days.

(21) Appl. No.: 15/391,277

(22) Filed: Dec. 27, 2016

(65) Prior Publication Data

US 2018/0180352 A1    Jun. 28, 2018

(51) Int. Cl.
| | | |
|---|---|---|
| F25D 3/08 | (2006.01) | |
| F25D 31/00 | (2006.01) | |
| F25D 3/06 | (2006.01) | |
| A47J 43/27 | (2006.01) | |

(52) U.S. Cl.
CPC ............ *F25D 31/002* (2013.01); *A47J 43/27* (2013.01); *F25D 3/06* (2013.01); *F25D 3/08* (2013.01); *F25D 2303/0831* (2013.01)

(58) Field of Classification Search
CPC . F25D 31/002; F25D 3/06; F25D 3/08; F25D 2303/0831; F25D 31/007; F25D 2331/803–805; A47G 19/2288
See application file for complete search history.

(56) References Cited

U.S. PATENT DOCUMENTS

| 5,325,680 A | * | 7/1994 | Baroso-Lujan | ......... F25D 3/107 |
| | | | | 62/294 |
| 2010/0011802 A1 | * | 1/2010 | Vrabel | ...................... F25D 7/00 |
| | | | | 62/457.4 |
| 2010/0288724 A1 | * | 11/2010 | Jahn | ................... B65D 81/3881 |
| | | | | 215/386 |
| 2012/0234789 A1 | * | 9/2012 | Mason | ................... B65D 77/28 |
| | | | | 215/229 |

FOREIGN PATENT DOCUMENTS

| FR | 655238 A | 4/1929 |
| WO | 2012113025 A1 | 8/2012 |

OTHER PUBLICATIONS

Extended search report for corresponding EPO application No. 17177968.9, dated Feb. 8, 2018 (9 pages).

* cited by examiner

*Primary Examiner* — Henry T Crenshaw
*Assistant Examiner* — Kamran Tavakoldavani
(74) *Attorney, Agent, or Firm* — Abelman, Frayne & Schwab

(57) ABSTRACT

A beverage chiller contains two compartments, allowing coolant to be introduced into the first compartment, and allowing a beverage to be introduced into the second compartment. Heat transfer between the first compartment and the second compartment allows for rapid cooling of the beverage.

10 Claims, 2 Drawing Sheets

BEVERAGE CHILLER

BACKGROUND OF THE INVENTION

1. Field of the Invention

The present invention relates generally to a beverage chiller that allows introduction of a coolant into a first compartment and a beverage into a second compartment, with heat transfer between the first compartment and the second compartment allowing for rapid cooling of the beverage.

2. Description of the Related Art

Bartenders frequently use a cocktail shaker for mixing beverages to be served to customers. Typically, one or more alcoholic beverages are mixed with other items, such as fruit juices, syrups, and bitters. Ice, in cubed or crushed form, can also be introduced into the cocktail shaker for the purpose of cooling the beverage that is being prepared. The cocktail shaker is then vigorously shaken by the bartender to mix the ingredients and, if ice is included, to chill the mixed beverage. After preparation, any ice that is included can be served to the customer with the mixed beverage, or the ice can be removed, such as with a strainer, or by the bartender narrowly separating the parts of the cocktail shaker and pouring the mixed beverage out of the shaker while retaining the ice within the shaker.

One problem with this prior art cocktail shaker design and method is that even if the beverages and ice are only placed together for a short period of time, there will be some melting of the ice and therefore dilution of the beverage. Another problem is that it is desirable to wash the cocktail shaker after use\ in order to remove any taste from the mixed beverage before using the shaker again to prepare a different mixed beverage. That leads to any retained ice being discarded, or even if an attempt is made to wash the ice and reuse it for the next mixed beverage preparation, the ice will undergo some melting and loss during the washing procedure.

What is required is a beverage chiller that allows a bartender to quickly chill a beverage, whether a mixed beverage or even a single unmixed beverage, without diluting the beverage with water from melting ice, and that also allows reuse of the ice from chilling one drink to the next, without needing to strain the ice or wash it.

BRIEF SUMMARY OF THE INVENTION

The present invention discloses a beverage chiller that is separated into two compartments, including a first compartment for holding a coolant such as a water and ice mixture, and a second compartment for holding a beverage for chilling. When filled, a user such as a bartender shakes the beverage chiller vigorously, facilitating a heat exchange wherein the coolant absorbs heat from the beverage, cooling the beverage. The first and second compartments are designed to provide significant surface area between them, facilitating the heat exchange.

The second compartment can be used for mixing two or more beverages, in which case the invention can be considered a type of cocktail shaker that also provides for chilling the mixed beverage without diluting it with water from melting ice. Alternatively, the second compartment can be used for a single unmixed beverage, in which case the invention can be considered as a beverage chiller.

While some alcoholic beverages such as vodka may be stored in a refrigerator or freezer, most alcoholic beverages are stored at room temperature. Many syrups are also stored at room temperature. While some consumers of alcoholic beverages may prefer them to be served at room temperatures, others prefer that the alcoholic beverages be chilled. This invention allows either a single beverage or a mixture of beverages to be rapidly cooled, without dilution from melting ice.

BRIEF DESCRIPTION OF THE DRAWINGS

Further advantages and features of the present invention will become apparent from the detailed description of a preferred embodiment of the invention with reference to the accompanying drawings, in which.

Figure 1:
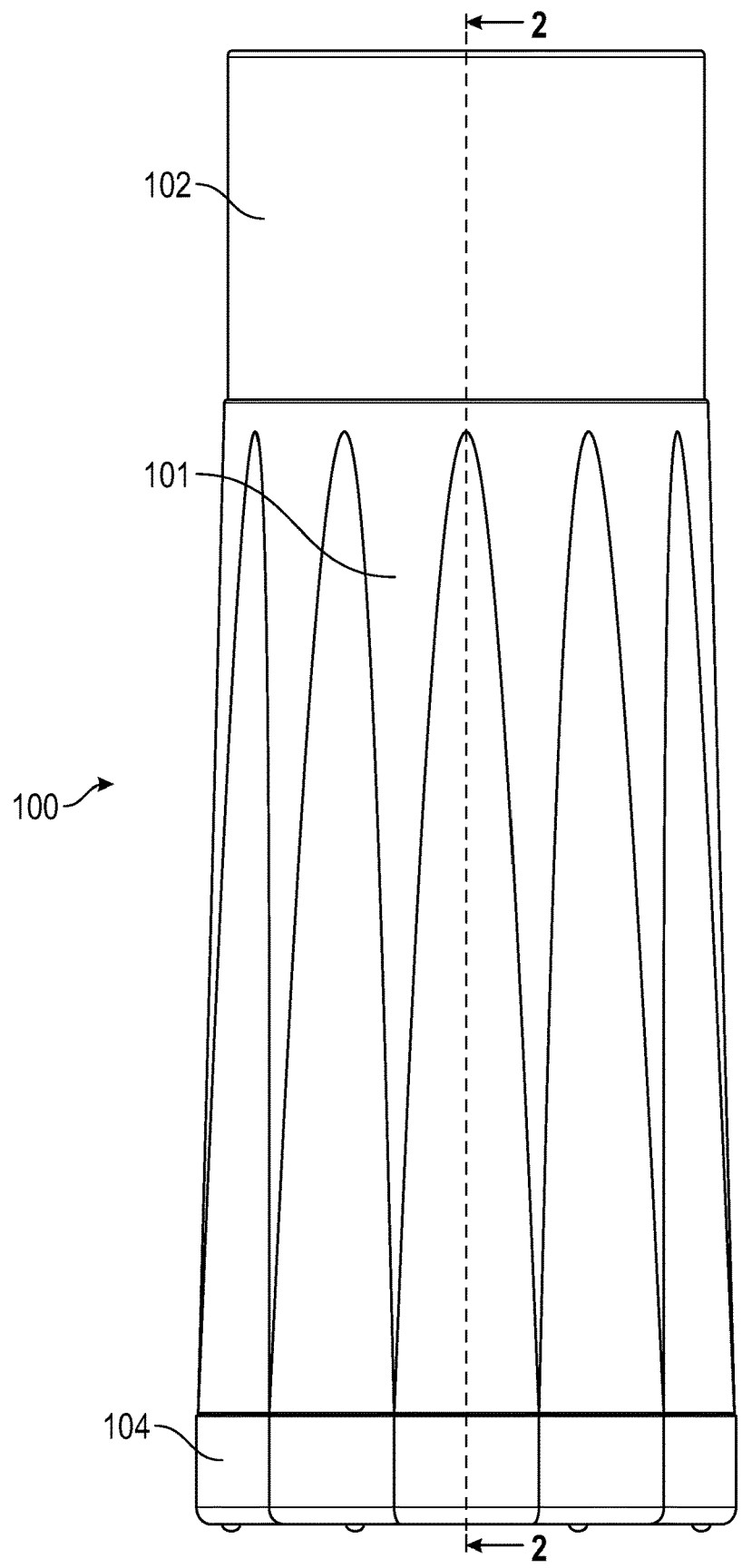
FIG. 1 is a view of one embodiment of the beverage chiller.

To facilitate understanding of the invention, identical reference numerals have been used, when appropriate, to designate the same or similar elements that are common to the figures. Further, unless stated otherwise, the drawings shown and discussed in the figures are not drawn to scale, but are shown for illustrative purposes only.

DETAILED DESCRIPTION OF THE INVENTION

Reference will now be made in detail to implementations of the invention, examples of which are illustrated in the accompanying drawings.

FIG. 1 illustrates an embodiment of a beverage chiller 100 that includes a main body 101, a top lid 102, and a bottom lid 104. The main body 101 can be made from any of a number of materials, including metals or thermoplastics. As the beverage chiller 100 will contain a coolant when in use, and it is desirable to retain the coolant for a number of uses of the beverage chiller 100, it is preferable that main body 101 be made from an insulating material, such as a thermoplastic, or such as a layered construction of metal and a glass or thermoplastic. A second benefit for using an insulating material for main body 101 is that a user who grasps and shakes the beverage chiller 100 will not experience the discomfort of grabbing an object with an exterior temperature that is well below room temperature.

In preferred embodiments, the main body 101 will have a cylindrical, frustoconical, or frustopyramidal shape, with a total internal volume of 0.5-2 liters, and more preferably 1 liter. However, this should not be considered limiting, as a wide variety of shapes and sizes are possible. In a preferred embodiment the exterior surface of main body 101 can be designed with grooves, ridges, a pebbled surface, or other known surfaces that provide for a user to obtain a good grip on an item, which is especially important as the beverage 100 is designed for a bartender or other user to shake the assembled and filled beverage chiller 100 vigorously.

Top lid 102 and bottom lid 104 can similarly be made from metal or thermoplastic. Preferably, an insulating material will be used, for the same reason as stated above for main body 101. Preferably, main body 101, top lid 102, and bottom lid 104 will be threaded, so that top lid 102 and bottom lid 104 can be quickly screwed onto and apart from the main body 101.

Figure 2:
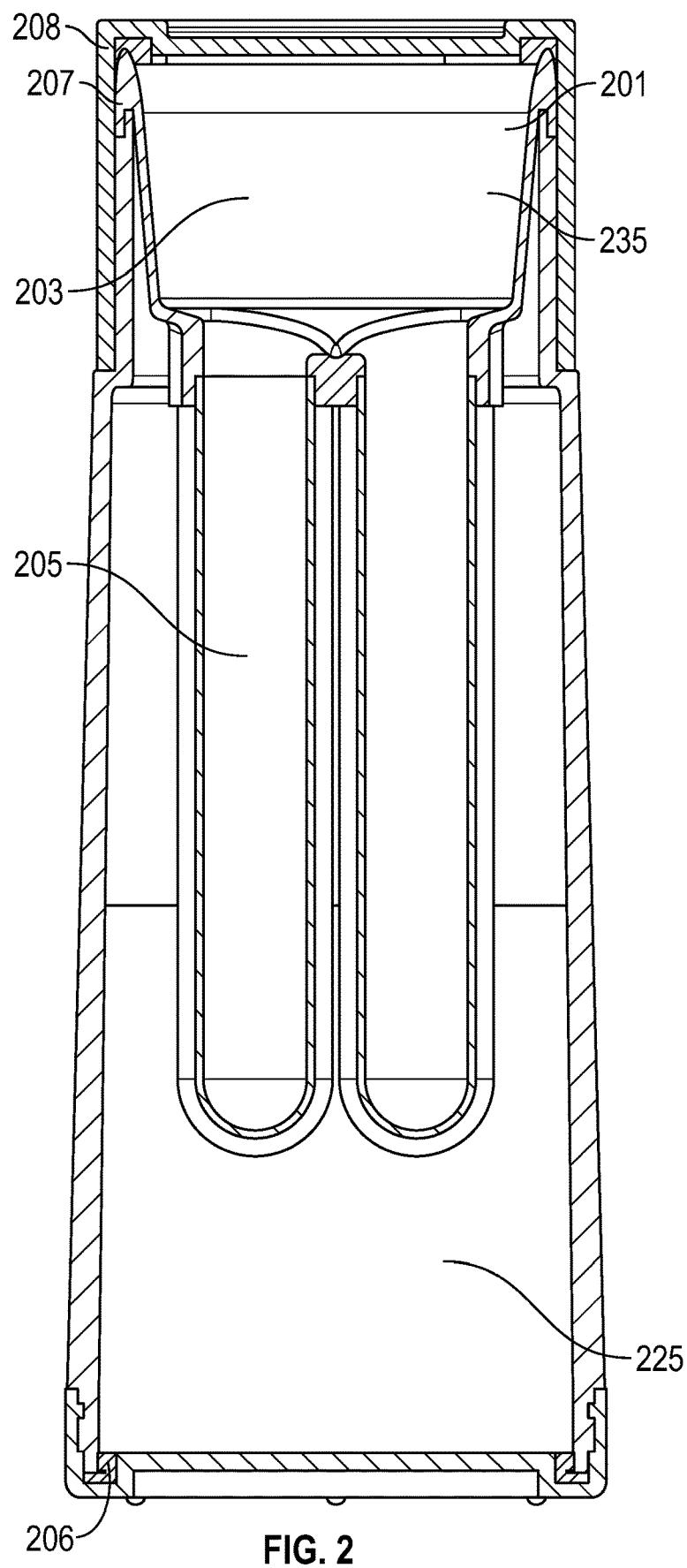
FIG. 2 is a cross-section of the beverage chiller, showing the interior structure.

FIG. 2 illustrates a cross section of beverage chiller 100. Internal assembly 201 comprises a funnel 203 and a core unit 205. Core unit 205 contains a plurality of cores, preferably three, though two or four cores can also be used. The cores are made of a heat-conducting material, such as aluminum or stainless steel. They are preferably of a cylindrical or tubular design, and are spaced apart from each other, providing for significant surface area that will allow for efficient heat transfer between a coolant to be placed on the outside of core unit 205, and a beverage to be placed on the inside of core unit 205. Funnel 203 communicates with the internal volume of each of the plurality of cores of core unit 205. In a preferred embodiment, funnel 203 is made of an insulating material such as a thermoplastic, and the beverage to be cooled has emptied completely from funnel 203 and is contained completely within core unit 205. However, other embodiments are possible, including funnel 203 being made from a heat-transmitting material, such as an embodiment in which funnel 203 and core unit 205 are made from the same material, for example if it is desired that the beverage to be cooled is contained partly within core unit 205, with an overflow amount remaining in funnel 203.

Internal assembly 201 is mounted within main body 101. In a preferred embodiment, internal assembly 201 is inserted to and removed from main body 101 via top lid 102. In a preferred embodiment, internal assembly 201 slides into main body 101, and can be held in place by any of a variety of known techniques, such as a pin and slot construction, or by internal assembly 201 having tapered side walls and by main body 101 also having tapered side walls, such that internal assembly 201 will only slide so far into main body 101. Alternatively, internal assembly 201 can be threaded to fit within threads inside main body 101. The design consideration for holding internal assembly 201 in place within main body 101 is that internal assembly 201 should be able to be removed readily for cleaning.

A first compartment 225 suitable for holding a coolant is defined by an exterior surface of the internal assembly 201, an interior surface of the main body 101, and an interior surface of the bottom lid 104. In one embodiment, a second compartment 235 suitable for holding a beverage is defined by an interior surface of internal assembly 201, i.e., including both core unit 205 and funnel 203. In a preferred embodiment, second compartment 235 is defined solely by the internal volume of core unit 205.

In a preferred embodiment in which main body 101 has a volume of 1 liter, and the second compartment 235 is defined solely by the internal volume of core unit 205, the second compartment 235 will hold between 100-300 ml of a beverage, and more preferably 200 ml.

A funnel seal 207 is provided within main body 101, to prevent any leakage of the coolant from first compartment 225 into second compartment 235, and conversely to prevent any leakage of the beverage from second compartment 235 into first compartment 225.

A top lid seal 208 is provided within main body 101, to prevent any leakage of the beverage from first compartment 225 through top lid 102 when a user vigorously shakes beverage chiller 100. Similarly, a bottom lid seal 206 is provided within main body 101, to prevent any leakage of the coolant from second compartment 235 through bottom lid 104 when a user vigorously shakes beverage chiller 100.

Any of a variety of known seal designs can be used for funnel seal 207, top lid seal 208, and bottom lid seal 206, including a rubber silicon o-ring, a crimp channel that holds a rubber seal, and so forth.

In a preferred embodiment, top lid 102 is designed as a measuring cup for measuring the beverage to be introduced into internal assembly 201. For example, top lid 102 can be designed to hold the volume of a jigger, i.e., 1.5 ounces or 44.4 ml, or can be designed to hold a larger quantity, such as the volume of second compartment 235.

The coolant, no shown, should preferably be non-toxic, and in a preferred embodiment should be a mixture of water and ice.

To use the beverage chiller 100, a bartender or other user will remove bottom lid 104 from the assembled beverage chiller 100, and will add a coolant, such as a mixture of water and ice, into the first compartment 225. The user will then replace bottom lid 104. The user will then remove top lid 102, and add a beverage or mixture of beverages into second compartment 235. The user will then replace top lid 102, and vigorously shake beverage chiller 100 for approximately 20 seconds. The user will then remove top lid 102, and pour out the chilled beverage for serving.

Although an exemplary description of the invention has been set forth above to enable those of ordinary skill in the art to make and use the invention, that description should not be construed to limit the invention, and various modifications and variations may be made to the description without departing from the scope of the invention, as will be understood by those with ordinary skill in the art, and the scope thereof is determined by the claims that follow.

What is claimed is:

1. A beverage chiller, comprising:
   a main body with a removable top lid and a removable bottom lid;
   a removable internal assembly positioned within the main body, comprising a funnel and a core unit, wherein the core unit comprises a plurality of tubes,
   wherein a first compartment for holding a coolant is defined by an exterior surface of the internal assembly, an interior surface of the main body, and an interior surface of the bottom lid,
   wherein a second compartment for holding a beverage comprises a volume of the core unit, and
   wherein the beverage chiller is configured so that a user introduces the coolant into the first compartment through the removable bottom lid and introduces the beverage into the second compartment through the removable top lid.

2. The beverage chiller of claim 1, in which the main body is cylindrical.

3. The beverage chiller of claim 1, in which the main body is frustoconical.

4. The beverage chiller of claim 1, in which the main body is made from an insulating material.

5. The beverage chiller of claim 1, in which the main body is made from an insulating material and the core unit is made from a heat-conducting material.

6. The beverage chiller of claim 1, in which the plurality of tubes is three tubes.

7. The beverage chiller of claim 1, in which the removable top lid is a cup that is marked for measuring a volume of the beverage.

8. The beverage chiller of claim 1, in which the removable top lid is a cup that has a volume corresponding to that of the core unit.

9. The beverage chiller of claim 1, in which the removable top lid is a cup that has a volume corresponding to that of the core unit plus that of the funnel.

10. The beverage chiller of claim 1, in which the coolant comprises a mixture of water and ice.

* * * * *